United States Patent [19]

Isawa et al.

[11] Patent Number: 4,738,170
[45] Date of Patent: Apr. 19, 1988

[54] MACHINE TOOL

[75] Inventors: Kunihiro Isawa, Anjo; Akira Hori, Iseshara, both of Japan

[73] Assignees: Washino Engineering Company, Limited; Amada Company, Limited, both of Japan

[21] Appl. No.: 946,100

[22] Filed: Dec. 23, 1986

Related U.S. Application Data

[63] Continuation of Ser. No. 693,980, Jan. 23, 1985, abandoned.

[30] Foreign Application Priority Data

Jan. 24, 1984 [JP] Japan .................. 59-009410

[51] Int. Cl.⁴ ........................... B23B 3/20; B23B 7/04
[52] U.S. Cl. ....................... 82/2 D; 29/40; 82/32; 82/36 A; 408/35
[58] Field of Search ............ 82/2 R, 2 D, 32, 36 A; 29/39, 40, 568; 408/35

[56] References Cited

U.S. PATENT DOCUMENTS

| | | | |
|---|---|---|---|
| 2,080,207 | 5/1937 | Hoppe | 82/32 |
| 2,342,792 | 2/1944 | Dare et al. | 82/25 |
| 2,685,122 | 8/1954 | Berthiez | 29/39 |
| 3,307,438 | 3/1967 | Bottger et al. | 82/2 D |
| 3,546,774 | 12/1970 | Stoeferle et al. | 29/568 |
| 3,717,417 | 2/1973 | Aubrier | 29/40 |
| 3,841,200 | 10/1974 | Berthiez | 82/2 D |

FOREIGN PATENT DOCUMENTS

| | | | |
|---|---|---|---|
| 3009609 | 9/1981 | Fed. Rep. of Germany | 82/2 D |
| 53103 | 3/1984 | Japan | 82/2 D |

*Primary Examiner*—Frederick R. Schmidt
*Assistant Examiner*—William E. Terrell
*Attorney, Agent, or Firm*—Wigman & Cohen

[57] ABSTRACT

A machine tool in which processing can be performed on the workpiece from two directions and in which various types of machining processes other than turning can be performed on the workpiece by means of a turret on which a plurality of tools are mounted. The turret is freely indexible on a tool rest which is mounted on a horizontal guide for horizontal positioning. The horizontal guide is mounted for vertical positioning on a vertical column which is in turn mounted on a horizontal slide member the axis of which is perpendicular to the horizontal guide section supporting the tool rest. A workpiece holder is mounted for free rotation on the frame of the machine tool. The turret may thus be positioned and indexed so as to select one of a variety of processing tools such as a cutting tool, a drill, a milling cutter, or the like, and to perform the processing in either a horizontal or vertical direction.

6 Claims, 2 Drawing Sheets

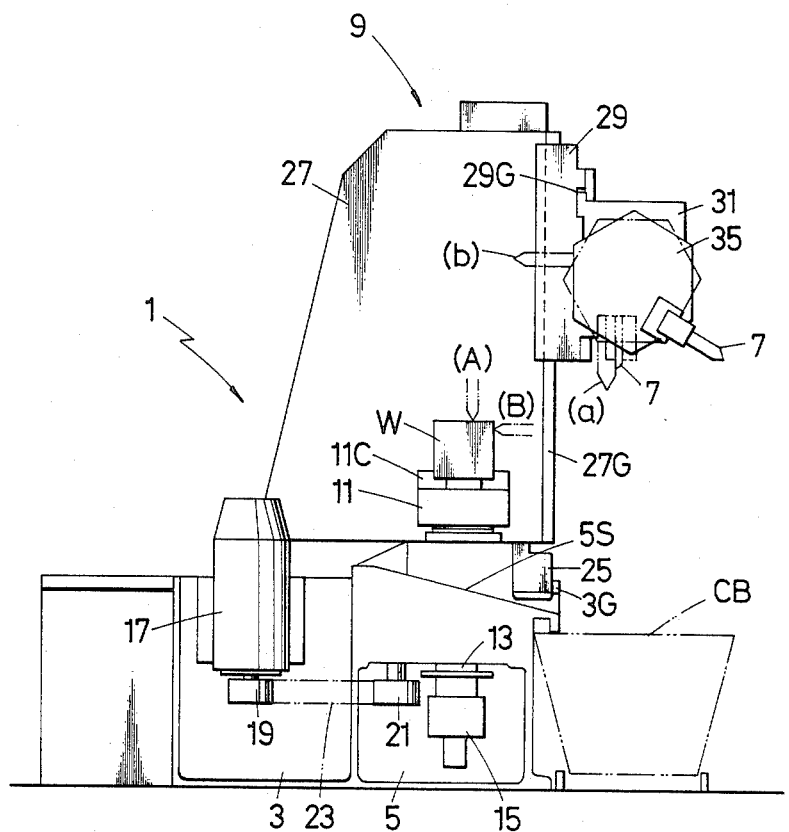

MACHINE TOOL

This is a continuation of co-pending application Ser. No. 693,980 filed on Jan. 23, 1985.

BACKGROUND OF THE INVENTION

1. Field of the Invention

The present invention relates to a machine tool, and more specifically to a machine tool such as a machining center which carries out machining operations on a workpiece.

2. Description of the Prior Art

Conventionally, a machining center and the like, for example, is well known as a machine tool. A machining center is provided with a variety of processing tools with which it carries out various types of processing on a workpiece. However, in a machining center, measures must be taken to connect and disconnect the processing tools on the processing head each time there is a change in the processing carried out on the workpiece, so that, in the case of a product with a comparatively small number of processing steps, improvement of this operation is a problem. In addition, an automatic tool changing (ATC) device is necessary to automatically disconnect, change, and reconnect the processing tools on the processing head, so another problem is that the overall configuration requires conversion to a large sized model.

SUMMARY OF THE INVENTION

A first object of the present invention, is to provide, with due consideration to the drawbacks of such conventional devices, a machine tool with which processing can be performed on the workpiece from two directions.

A second object of the present invention is to provide a machine tool with which various types of processes other than turning can be performed on the workpiece.

In the present invention, in order to achieve such objects, a freely rotatable chuck means for clamping the workpiece is provided on a work supporting stand which is an integral part of the base, and a slide member on a horizontal guide section formed on the upper surface of the base is provided, supported in a freely reciprocating manner. An elevating slide member, supported in a freely vertically moving manner, is provided on a column member vertically erected on this slide member. A tool rest supported on this elevated slide member is horizontally provided in a freely reciprocal manner at 90 degrees to the reciprocating direction of the slide member, and a plurality of processing tools which perform processing on a workpiece gripped by the previously mentioned clamp device, are mounted on a turret member supported in a freely rotatable manner on this tool rest.

BRIEF DESCRIPTION OF THE DRAWINGS

These and other objects, features and advantages of the present invention will become more apparent from the following description of a preferred embodiment taken in conjunction with the accompanying drawings, in which:

FIG. 2 is a left side elevation, viewed from the left direction of FIG. 1.

DESCRIPTION OF THE PREFERRED EMBODIMENT

Figure 1:
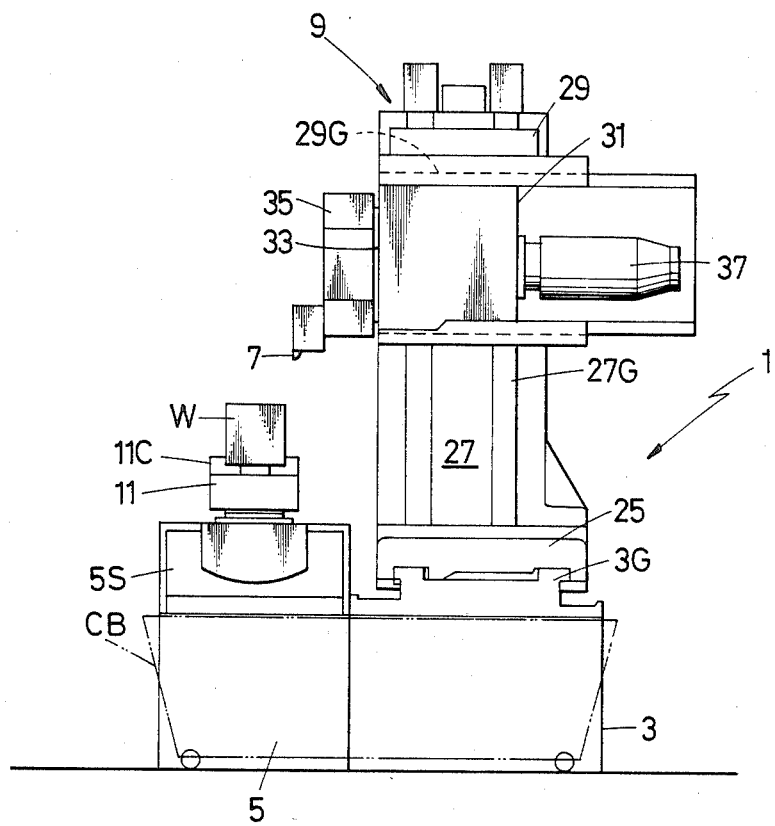
FIG. 1 is a front elevation showing, in abbreviated form, a machine tool which relates to the present invention.

Now referring to FIG. 1 and FIG. 2, a machine tool 1 comprises a box-shaped base 3, a work supporting stand 5, which is provided integrally with the base 3, to support a workpiece W which is to be processed, and a processing head device 9, which is equipped with a plurality of processing tools 7 which process the workpiece W.

In more detail, the work supporting stand 5 is provided as an integral part of the side section of the base 3, and a shutter section 5S for discharging the cuttings from the workpiece W into a freely movable, buggy-shaped chip box CB is formed at an inclination to the upper surface of the stand 5. A chuck means 11—for example, a scroll chuck—is provided on this work supporting stand 5, to grasp and support the workpiece W. This chuck means 11 is mounted on the upper end of a rotary shaft 13 which is supported perpendicular to the work supporting stand 5 in a freely rotatable manner. A plurality of chuck grips 11C are provided on the chuck means to hold the workpiece W. The gripping and releasing action on the workpiece W of the chuck grips 11C, is performed by the action of a chuck drive cylinder 15, which is mounted on the lower end of the rotary shaft 13. The construction by which the chuck grips 11C grasp and release the workpiece W through the action of this chuck drive cylinder 15, is the same construction which is found in a normal power chuck. A detailed operation will therefore be omitted.

The rotary shaft 13 is rotatably driven by a suitable control motor 17, such as a servomotor or a stepping motor, mounted on the work supporting stand 5. A detailed explanatory diagram has been omitted. However, the control motor 17 and the rotary shaft 13 are linked through a drive pulley 19 provided on the control motor 17, an intermediate pulley 21 supported in a freely rotatable manner on the work support stand 5, and a belt 23 which encloses both the pulleys 19 and 21. The control motor 17 is driven under the control of a suitable control means such as a numerical control device or computer. Further, a detailed explanatory drawing has been omitted, but, a rotary position detecting means such as a pulse encoder, for example, is mounted on the rotary shaft 13, and is constructed so that it is capable of detecting the angle of rotation of the workpiece W from a standard position of rotation. It is also capable of indexing an arbitrary rotary position of the workpiece W. In addition, a braking means is provided on the rotary shaft 13 or on the control motor 17 which can secure the rotary shaft 13 in an arbitrary rotary position.

To explain in more detail—the workpiece W clamped in the chuck means 11 is rotatably driven by the control motor 17. In addition, the workpiece W can be indexed in an arbitrary rotary position through suitable control of the control motor 17.

The processing head device 9, on which are provided the processing tools 7, is supported on the base 3. In more detail, a horizontal guide section 3G is formed on the upper surface of the base 3, and a slide member 25 is supported on the horizontal guide section 3G in a freely reciprocating manner. A detailed explanatory diagram has been omitted. However, the reciprocating action of the slide member 25 is activated by means of a ball screw mechanism driven by a drive means such as a servomotor, so that the reciprocating motion and the positioning of the slide member 25 are performed under the control of a control means.

A column member 27 is erected vertically on the slide member 25, and an elevating slide member 29 is supported, so that it is freely capable of vertical movement, on a perpendicular guide section 27G formed on the column member 27. The vertical motion of the elevating slide member 29 is activated by means of a ball screw mechanism (for which a detailed explanatory diagram has been omitted) so that the vertical movement and vertical positioning of the elevating slide member 29 is controlled by a control means.

A horizontal guide section 29G which is positioned 90 degrees to the horizontal guide section 3G, is formed on the elevating slide member 29. The tool rest 31 is supported in a freely reciprocating manner on the guide section 29G. The reciprocating motion of the tool rest 31 is activated by means of a ball screw mechanism for which a detailed explanatory diagram has been omitted, so that the horizontal movement and horizontal positioning of the tool rest 31 is controlled by a control means.

On one side of the tool rest 31, a turret member 35 is supported in a freely rotating and freely indexable manner through a horizontal shaft 33.

The turret member 35 is formed in a multiangled shape, and the processing tools 7 are mounted on its circumferential surface. A variety of processing tools such as cutting tools, drills, milling cutters, and the like are provided. The drills and milling cutters are constructed so as to be driven by the drive motor 37 mounted on the tool rest 32. Further, when indexing the turret member 35, an indexing motor (not shwon on the drawings) mounted on the tool rest 31 is controlled by a control means. Because the indexing mechanism and the power transmission mechanism which transmits power to the processing tools 7 from drive motor 37 can be of conventional construction, a detailed explanation will be omitted.

It is evident that, by means of a configuration such as outlined above, the slide member 25, running along the horizontal guide section 3G of the base 3, moves in a reciprocating manner, and the elevating slide member 29, running along the guide section 27G on the column member 27, moves vertically. Further, the tool rest 31, running along the horizontal guide section 29G of the elevating slide member 29, moves in a reciprocating manner. Therefore the turret member 35 supported by the tool rest 31 can move three dimensionally. The processing tools 7, are indexed by the rotation of the turret member 35 as shown, for example, as (a) in FIG. 2 in a perpendicular status, or as (b), in a horizontal status. Accordingly, the processing can be carried out on the workpiece W as shown in (A), from the upper direction, or as shown in (B), from the horizontal direction.

That is, by means of the present invention in the case where a cutting tool is used as the processing tool 7, turning of the workpiece W, for example, can be carried out. In addition, it is possible to create a perforation in a suitable location on the workpiece W, or to carry out a cutting operation by suitably performing the rotary positioning of the workpiece W, and by the use of a drill or milling cutter as a processing tool.

As already explained, by means of the present invention, it is possible to carry out the turning of the workpiece, to drill and cut the workpiece, and the like without disconnecting and reconnecting a processing tool on the turret member. Furthermore, vertical and horizontal processing of the workpiece can be performed, and the functions of a vertical type and a horizontal type machining center also can be obtained.

What is claimed is:

1. A machine tool, comprising:

a base;

a work supporting stand formed integrally with the base;

a freely rotatable chuck member for clamping a workpiece on the work supporting stand said chuck member having an axis of rotation on said base describing a surface of revolution;

means for rotating said chuck member;

a horizontal guide section formed on a surface of the base;

a freely reciprocating slide member on the horizontal guide section positioned so as to slide in a direction which is tangential to the surface of revolution described by the axis of rotation of said chuck member;

means for moving said slide member on said horizontal guide section;

a column member installed vertically on the freely reciprocating horizontal slide member;

an elevating slide member which is freely movable in the vertical direction on the column member installed vertically on the horizontal slide member;

means for vertically moving said elevating slide member on said column member;

a tool rest supported for horizontal motion on the elevating slide member, which is capable of freely reciprocating motion in the horizontal direction at right angles to the reciprocating direction of the horizontal slide member;

means for moving said tool rest in the horizontal direction perpendicular to the reciprocating horizontal direction of the slide member;

a turret section supported on the tool rest, which is freely indexible;

means for indexing said turret section on said tool rest;

a plurality of processing tools mounted on the turret section which processing tools perform processing actions on the workpiece which is clamped in the chuck member, each of said tools having a longitudinal axis wherein said tools are mounted on said turret section such that the longitudinal axis of each of said tools lies in a plane which is perpendicular to the plane of horizontal motion of said tool rest on said elevating member;

wherein said turret section is freely indexible to position the tools so that the longitudinal axis of each of the tools mounted on the turret section may be oriented both vertically and horizontally for processing of the workpiece by the tools in both the vertical and horizontal directions; wherein said chuck member is rotatably driven to use the machine tool as a vertical lathe and indexibly driven to an angular position from a standard position to use the machine tool as a machine for performing rotary tool operations on stationary work; and means for driving said processing tools to process said workpiece.

2. The machine tool of claim 1 in which the chuck member can be freely indexed to an arbitrary angle.

3. The machine tool of claim 1 in which the plurality of processing tools are directed in the radial direction of the turret section.

4. A machine tool, comprising:
- a frame;
- workpiece holding and positioning means mounted on the frame for holding and positioning a workpiece said means defining an axis of rotation on said frame describing a surface of revolution;
- first sliding means mounted on the frame for sliding on the frame in a first horizontal direction which is tangential to the surface of revolution described by the axis of rotation defined by said workpiece holding and positioning means;
- means for sliding said first sliding means of the frame;
- second sliding means mounted on the first sliding means for sliding on the first sliding means in a vertical direction;
- means for sliding said second sliding means on the first sliding means;
- third sliding means mounted on the second sliding means for sliding on the second sliding means in a second horizontal direction;
- indexing means mounted on the third sliding means;
- means for indexing said indexing means mounted on the third sliding means;
- a plurality of processing tools mounted on said indexing means, each of said tools having a longitudinal axis, said tools being mounted on said indexing means such that the longitudinal axis of each of said tools lies in a plane which is perpendicular to the plane of horizontal motion of said third sliding means on the second sliding means; and
- means for driving said processing tools to process said workpiece;
- wherein said indexing means are freely indexible to position said tools so that the longitudinal axis of each of said tools mounted on said indexing means may be oriented both vertically and horizontally; and
- wherein said workpiece holding and positioning means is rotatably driven to use the machine tool as a vertical lathe and indexibly driven to an angular position to use the machine tool as a machine for performing rotary tool operations on stationary work;
- said indexing and sliding means being adapted to selectively process the workpiece with the plurality of processing tools in both the vertical and horizontal directions.

5. The machine tool according to claim 4, wherein the processing tools comprise tools for cutting, drilling and milling.

6. The machine tool according to claim 4, wherein the workpiece holding and positioning means can be freely indexed to an arbitrary angle.

* * * * *